Oct. 27, 1959  D. T. AYERS, JR  2,909,898
HYDRAULICALLY OPERATED BOOSTER BRAKE MECHANISM
Filed May 17, 1957  4 Sheets-Sheet 4

INVENTOR
DAVID T. AYERS JR.

BY John F. Phillips

ATTORNEY

United States Patent Office 2,909,898
Patented Oct. 27, 1959

2,909,898
HYDRAULICALLY OPERATED BOOSTER BRAKE MECHANISM

David T. Ayers, Jr., Birmingham, Mich., assignor to Kelsey-Hayes Company, Detroit, Mich., a corporation of Delaware Application May 17, 1957, Serial No. 660,007

9 Claims. (Cl. 60—52)

This invention relates to a hydraulically operated booster brake mechanism and has particular reference to a novel type of hydraulic booster motor adapted for use in an open hydraulic system such as that employed on motor vehicles for the operation of power steering mechanisms. This invention is an improvement over the structure shown in the copending applications of William Stelzer, Serial No. 625,070, filed November 29, 1956, and Serial No. 631,106, filed December 28, 1956.

In the copending application referred to there is disclosed a novel type of booster brake mechanism employing a hydraulic motor arranged in the open hydraulic circuit through which fluid flows through a conventional open center valve mechanism for controlling the hydraulic motor of a steering mechanism. When the brakes are inoperative, the continuously pumped hydraulic fluid flows constantly through the brake booster motor, thence through the steering valve and back to the pump. Such a system also discloses an arrangement of parts wherein both ends of the brake booster motor are open to the source of pressure, thus normally balancing pressures on opposite sides of the brake motor piston. When the brake pedal is operated, a throttling valve is displaced from its normal off position to throttle the connection between the two ends of the booster motor, thus causing a building-up of pressure in one end of the motor for the actuation of the booster piston.

An important object of the present invention is to provide an novel system of the character discussed above wherein, under normal off brake conditions, pressures are perfectly balanced on opposite sides of the booster control valve, thus preventing the subjection of the valve to any pressure which would tend to operate it and subjecting the valve normally solely to the force of its biasing spring to maintain it in normal position.

A further object is to provide such a mechanism wherein the hydraulic motor piston is similarly normally pressure-balanced and wherein the system is so designed that if the brake motor is being operated and the steering wheel is turned to cause a back pressure in the hydraulic system between the steering motor and the hydraulic pump, pressures will be automatically proportionately increased in opposite ends of the hydraulic motor, thus eliminating any lumpiness in the operation of the booster brake motor under such conditions.

A further object is to provide a mechanism operative under the conditions referred to for porportionately increasing pressures on opposite sides of the control valve mechanism when the steering motor is operated while the brakes are being applied, thus preventing the operator from having to exert substantially increased pressure to maintain a given brake application.

A further object is to provide a mechanism of the character referred to wherein the pressure generating plunger of the power-operated master cylinder is supplied rearwardly thereof with pressure fluid from the pedal-operated master cylinder to assist the hydraulic motor in applying the brakes, and wherein the quantity of fluid which must be displaced back of the hydraulic plunger is reduced because of the difference in the characteristics of the present mechanism over that shown in the copending application referred to.

A further object is to provide a booster brake mechanism of the type discussed wherein an improved motor control valve and operating means therefor are provided, and wherein means is directly embodied with the motor for preventing the building-up of excessive pressure in the hydraulic motor, thus preventing undue reduction in the pressure available for operating the steering mechanism.

Other objects and advantages of the invention will become apparent during the course of the following description.

In the drawings I have shown one embodiment of the invention. In this showing:

Figure 1:
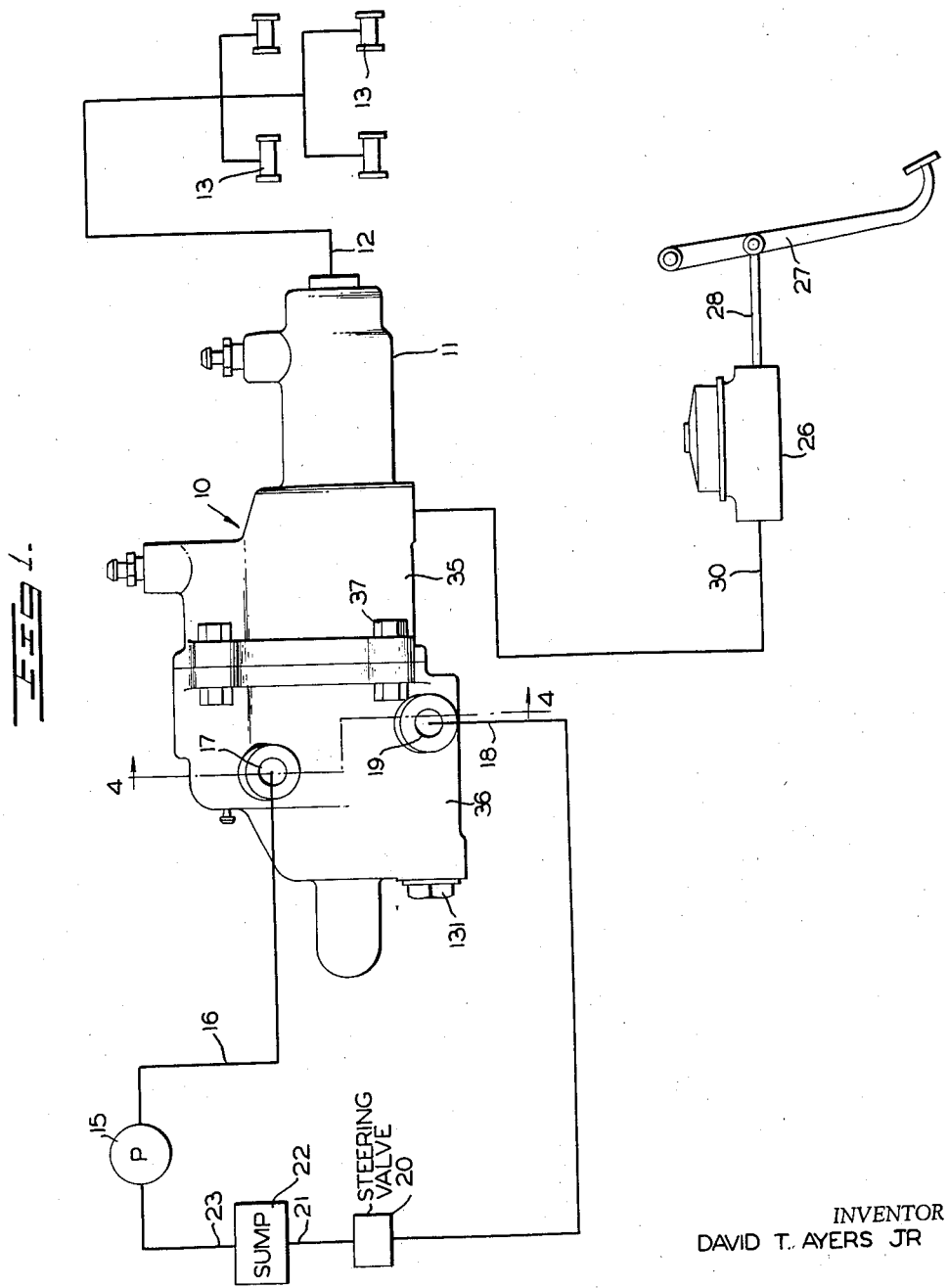
Figure 1 is a side elevation of the booster motor and associated elements, the remaining parts of the system being shown diagrammatically.

Referring to Figure 1, the numeral 10 designates a hydraulic motor as a whole having at one end thereof a power-operated master cylinder 11 described in detail below. This master cylinder has fluid lines 12 for supplying fluid to conventional wheel cylinders 13.

Fluid under pressure is pumped continuously by a pump 15 having a supply line 16 leading to an inlet port 17 for the motor, further referred to below. From the motor, a fluid line 18 is connected to an outlet port 19 to supply fluid continuously through a conventional open center steering valve 20 from which fluid flows through a line 21 to a conventional sump 22. This sump is connected as at 23 to the inlet side of the pump 15.

The mechanism is rendered operative by the displacement of fluid from a conventional master cylinder 26 operable by a pedal 27 through a rod 28 connected to a conventional plunger (not shown) for displacing fluid through a line 30 the connection of which with the booster mechanism is described below.

Figure 2:
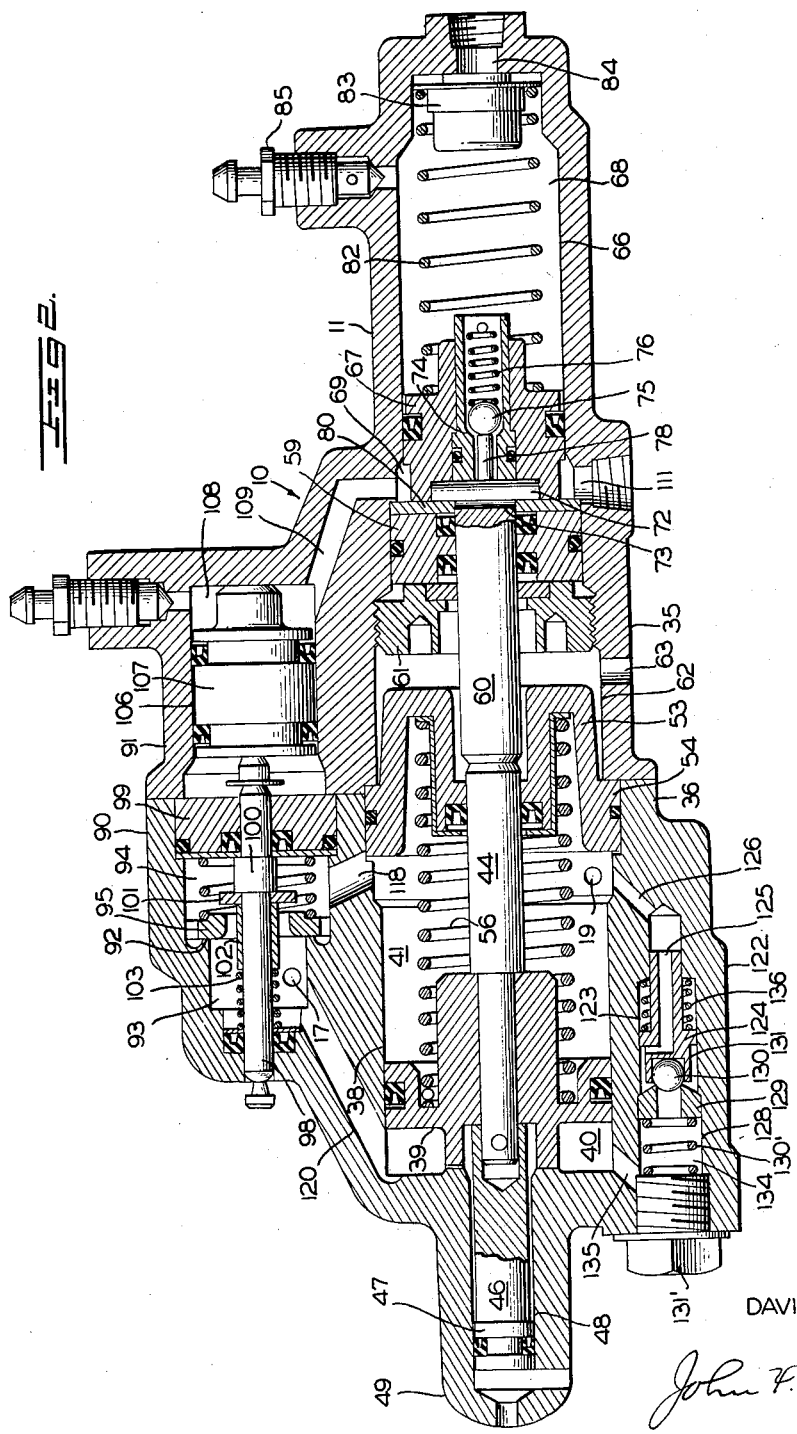
Figure 2 is an enlarged axial sectional view through the hydraulic motor and associated parts, all of the elements being shown in normal positions.

Referring to Figures 1 and 2, the motor 10 comprises a pair of body sections 35 and 36 secured together in any suitable manner, for example by bolts 37 (Figure 1). The body section 36 is provided therein with a cylinder 38 in which is mounted a piston 39 dividing the cylinder 38 to form a pair of chambers 40 and 41. From one end of the piston 39 projects a push rod 44 having a reduced axial extension projecting through the piston and fixed to a rod 46 having a head 47 projecting into a cylindrical opening 48 in an extension 49 carried by the body member 36. The space to the left of the head 47 is open to the atmosphere as shown, and for a purpose to be described, the stem 46 is equal in diameter to the push rod 44.

Figure 3:
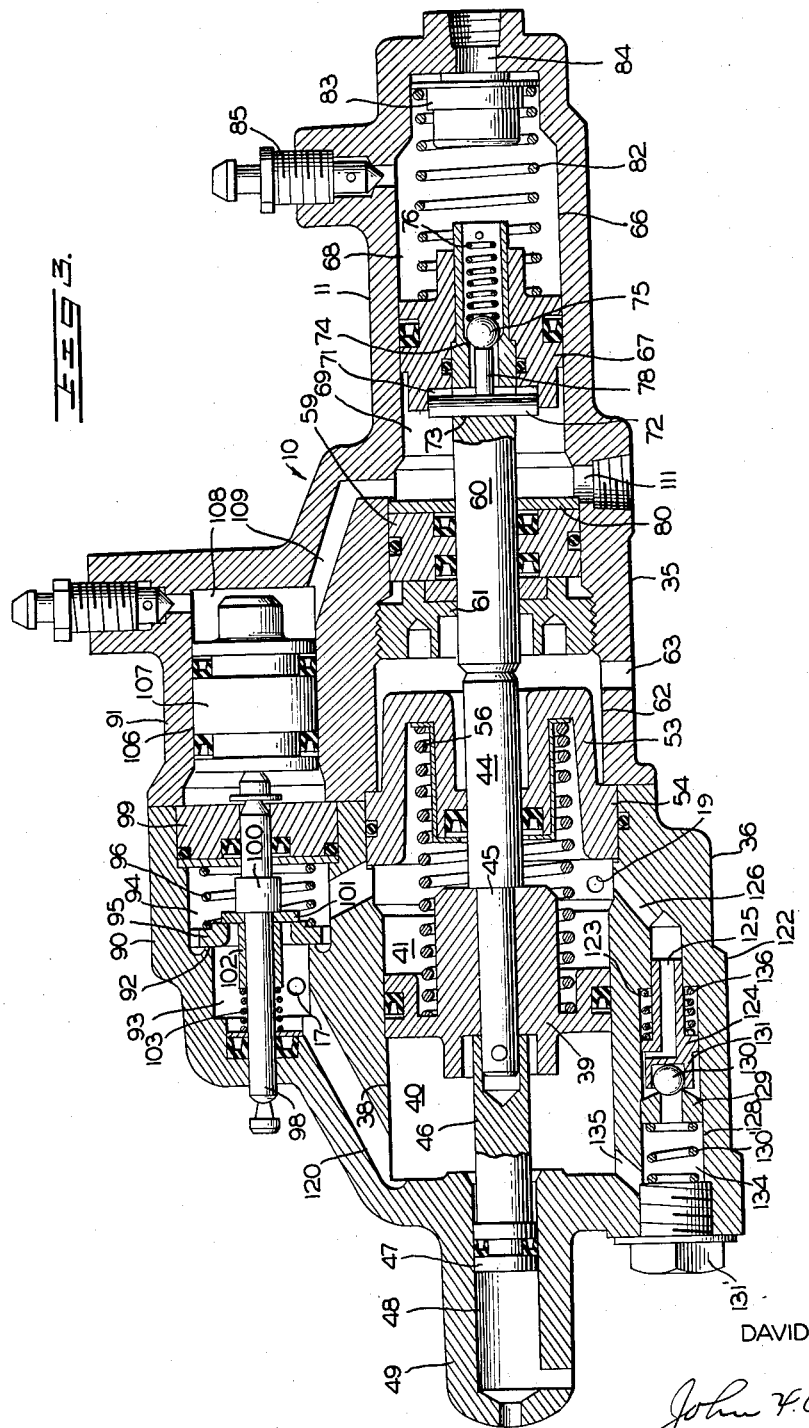
Figure 3 is a similar view showing the parts in operative positions which will be assumed under given brake operating conditions.

A bearing member 53 is provided at its left-hand end in Figures 2 and 3 with an annular flange 54 clamped in position by the two housing members 35 and 36, and the push rod 44 extends through the bearing member 53 in sealed relation thereto. The bearing member is preferably cup-shaped, as shown, to provide a deep recess in which is arranged one end of a spring 56, the other end of which engages the piston 39 to act as a return spring therefor. The bearing member 53 forms a cylinder head for one end of the chamber 41, as will be apparent.

In the body member 35 is arranged a bearing 59 in which is axially slidable a rod 60 arranged in axial alinement with the rod 44 and having abutting engagement therewith. The bearing 59 is retained in position by a nut 61 threaded in the body member 35. The latter member is provided with a bore 62 through which the nut 61 is inserted, and this bore is open to the atmosphere as at 63 for a purpose to be described.

The power master cylinder 11 is provided with a bore 66 in which is slidable a plunger 67 dividing the bore 66 to provide high and low pressure chambers 68 and 69 respectively. The plunger 67 is provided adjacent the low pressure chamber 69 with a recess 71 in which is arranged a pin 72 extending transversely of the rod 60 through a diametrical slot 73 formed therein, this slot being wider axially of the rod 60 than the thickness of the pin 72 to permit this pin to shift longitudinally of the rod 60 between the positions shown in Figures 2 and 3. The right-hand end of the rod 60 in Figures 2 and 3 is hollow and is provided therein with a valve seat 74 engageable by a ball valve member 75 urged to closed position by a spring 76. The ball 75 is adapted to be opened in the normal position of the parts in Figure 2 by a pin 78 engageable with or connected to the transverse pin 72. In the off positions of the parts shown in Figure 2, the left-hand end of the plunger 67 and the adjacent side of the pin 72 are engageable with a washer 80 to limit movement of the plunger 67 to its off position and to effect movement of the pin 72 into the recess 71 to open the valve member 75.

A return spring 82 in the chamber 68 engages the plunger 67 to urge this plunger to its normal off position. One end of the spring 82 surrounds and engages a conventional residual pressure valve 83 past which fluid displaced from the chamber 68 flows through a port 84 and thence into the brake lines 12. The power master cylinder 11 is shown as being provided with a conventional bleed valve 85 for the chamber 68.

A valve housing 90 is formed integral with the body member 36 and is arranged in abutting sealed relationship with a plunger housing 91 formed integral with the body member 35. In the housing 90 is formed a valve seat 92 between two chambers 93 and 94, and this seat is engaged by a combined seat and valve member 95. The member 95 is biased to the normal position shown in Figures 2 and 3 by a spring 96.

A stem 98 has one end slidable in a bearing 99 and has its opposite end slidable through the housing 90. The stem 98 carries an annular shoulder 100 engaging a valve member 101. The opposite end of this valve member is engaged by a sleeve 102 biased to the right in Figures 2 and 3 by a spring 103 whereby the valve member 101 tends to remain in its normal open position shown in Figure 2.

The housing 91 is provided with a bore 106 in which is slidable a sealed plunger 107 abutting th adjacent end of the stem 98. One end of the bore 106 forms a chamber 108 communicating through a passage 109 with the low pressure chamber 69 of the master cylinder 11. The master cylinder 11 is provided with a port 111 connected to the fluid line 30 from the pedal-operable master cylinder. Thus it will be apparent that when the pedal 27 is operated, fluid is displaced into the chamber 69, and through passage 109, into the chamber 108. Thus pedal-generated pressures will be introduced back of the plunger 67 and will be supplied to the chamber 108 to move the plunger 107 to the left.

Figure 4:
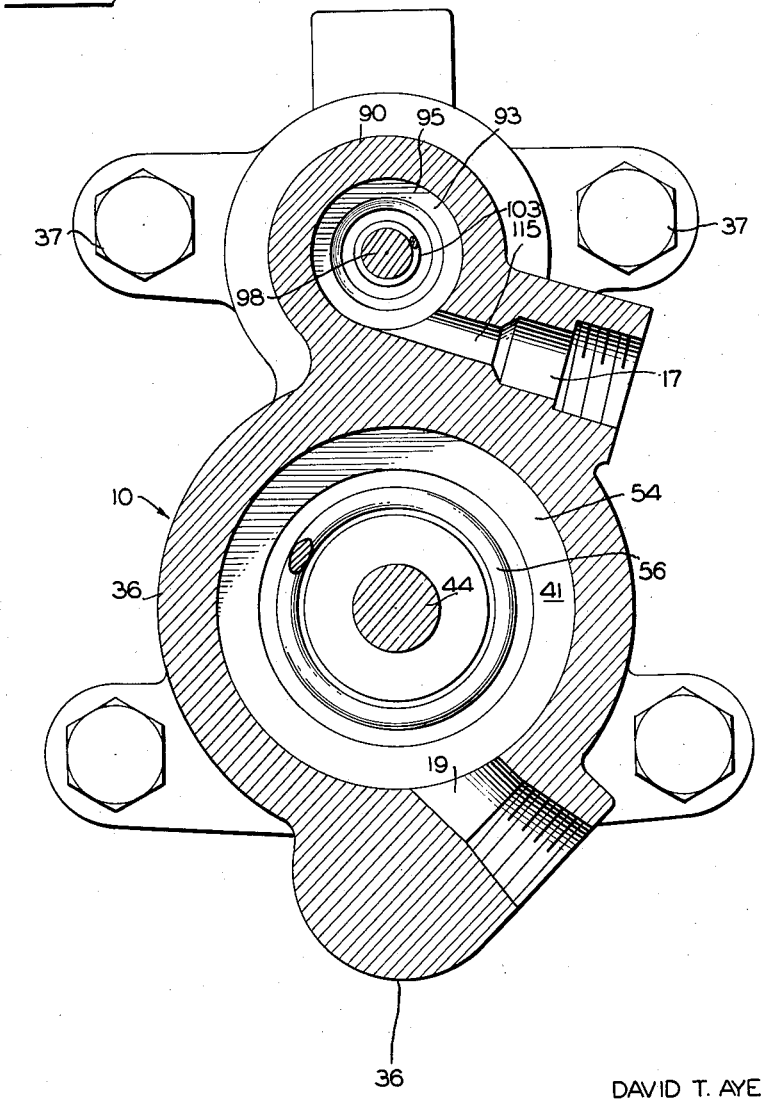
Figure 4 is an enlarged sectional view on line 4—4 of Figure 1.

Referring to Figure 4, it will be noted that the chamber 93 communicates through a passage 115 with the port 17, previously described, to which port fluid is supplied through pipe 16. Similarly, the motor chamber 41 communicates with the port 19 for the flow of fluid from the chamber 41 through line 18 and thence through the steering valve 20. It will be apparent that with the valve member 101 in its normal open position in Figure 2, fluid entering the chamber 93 will flow past the valve member 101 and will flow into the motor chamber 41 through a port 118. The fluid then flows out of port 19 which, for the purpose of illustration, has been indicated in Figures 2 and 3. Thus it will be apparent that the chamber 94 communicates with the motor chamber 41. Similarly, the valve chamber 93 communicates with the motor chamber 40 through a passage 120.

At the bottom thereof as viewed in Figures 2 and 3, the body member 36 is provided with an elongated radially extending enlargement 122 in which is formed a bore 123 receiving a sleeve member 124 having a passage 125 therethrough communicating at its right-hand end through passage 126 with the motor chamber 41. The enlargement 122 is provided at the lefthand end with a slightly larger bore 128 in which is arranged a valve seat 129 engageable by a ball 130 carried by a cage 131 formed integral with the sleeve member 124. The seat 129 is maintained in position by a spring 130' engaging at one end against a plug 131', closing the adjacent end of the bore 128. The spring 130' is arranged in a chamber 134 communicating with the motor chamber 40 through a passage 135. The ball 130 is maintained on its seat by a spring 136, and it will become apparent that when pressure in the chamber 134 rises to a predetermined extent, the ball 130 will be unseated to bypass fluid from the motor chamber 40 into the motor chamber 41 to predetermine the maximum pressure in the motor chamber 40.

*Operation*

The parts of the apparatus occupy the normal positions shown in Figure 2. Fluid flows from the pump 15 through line 16 into the chamber 93, thence around the normally open valve member 101 into the motor chamber 41. From such chamber fluid flows through line 18 and through the steering valve 20 into the sump 22, and fluid constantly flows from the sump through line 23 to the intake side of the pump 15. It will be apparent from Figure 2 that the chamber 93 is in constant communication with the motor chamber 40 and since fluid is circulating through the system, pressures will be balanced in the chambers 40 and 41. There necessarily will be a pressure in the motor chamber slightly above atmospheric pressure due to line resistances in the system. It will be noted that the rods 44 and 46 are of equal diameter, hence equal areas of the piston 39 will be exposed to the pressures in chambers 40 and 41 and there will be no tendency for the piston 39 to creep. In this connection, it is pointed out that the abutting surfaces of the piston 39 and body 10 are not smooth, and accordingly form no seal therebetween. Thus the effective pressure area of the left-hand end of the piston 39 open to the chamber 40 will be the area of the cylinder 38 minus the area of the rod 46. Similarly, the stem 98 of the valve mechanism is of the same cross-sectional area through its length, thus balancing pressures on opposite sides of the valve member 101 so that this valve member is freely biased to its normal position by the spring 103.

The valve member 75 remains open in the normal position of the parts, being moved to such position, as will become apparent below, when the brakes are released. Thus any loss of fluid from the high pressure end of the system can be replenished through the port 111. It also will become apparent that as soon as the motor is energized to move the plunger 67, the pin 72 will be released from the washer 80 and the spring 76 will seat the valve member 75.

Operation of the apparatus is effected by depression of the brake pedal 27 to displace fluid through line 30 and port 111 into chamber 69 and through passage 109 into the chamber 108. When this action takes place, there will be an immediate increase in pressure in the chamber 108 to displace the plunger 107 toward the left to move the valve member 101 toward its seat. This action throttles the flow of fluid through the valve seat member 95, thus causing an accumulation of pressure in the chamber 93 and consequently in the motor chamber 40. The piston 39 thus moves to the right to effect movement of the plunger 67 of the power master cylinder to displace fluid under pressure from the chamber 68. Such movement of the plunger 67 is assisted by pedal-generated pressures in the chamber 69. It will be apparent that the higher the pedal-generated pressures, the greater will be the force tending to move the valve operating plunger 107 to the left, and consequently the greater will be the throttling action performed by the valve member 101. This valve member will not actually completely close as in Figure 3 but will move in closer and closer proximity to its seat as pressures in the chamber 108 increase. Thus the greater the pressure exerted against the brake pedal, the greater will be the pressure built up in the motor chamber 40 to operate the fluid displacing plunger 67. The pressure developed in the chamber 69 by pedal force will be proportionate to the pressure in the motor chamber 40 and, accordingly, reaction against the brake pedal will increase during progressively increasing brake application.

During initial movement of the brake pedal to impart initial movement to the valve operating plunger 107, movement of such plunger will be opposed solely by the loading of the relatively light spring 103. After the throttling action of the valve member 101 starts to take place, higher pressures built up in the chamber 93 will act on the area of the valve member 101 exposed to the pressure in such chamber, and this will predetermine resistance to movement of the plunger 107 and hence will determine the pressure in the chamber 69 which must be developed by pedal operation. Therefore, the effective area of the valve member 101 determines the degree of hydraulic reaction against the brake pedal during initial stages of brake operation.

With the valve member 101 throttling communication between the chambers 93 and 94, pressure in the chamber 93 will continue to increase, and a point will be reached where pressure in the chamber 93 is sufficient to overcome the loading of the spring 96 and crack the member 95 from the seat 92. When this action takes place, the escape of fluid from the chamber 93 into the chamber 94 will take place around the member 95, and continued pressure on the brake pedal will seat the valve member 101. In this stage of operation of the brake system, it will be apparent that the reaction area exposed to the pressure in chamber 93 will be increased in accordance with the size of the opening through the port 92, whereas in the earlier stage, the reaction area will have been determined in accordance with the size of the opening through the valve seat member 95. During later stages of brake application, therefore, a higher ratio of reaction will be provided. In other words, substantially greater force must be generated by the pedal to maintain the necessary pressure in the chamber 108, hence the reaction pressure against the pedal will be increased. This mode of operation, that is, with lower pedal reaction in initial stages of brake operation and higher reaction in later stages, is highly desirable.

Assuming that during a brake operation the steering valve 20 is operated to energize the steering motor, pressure in the line 18 will increase, causing a corresponding increase in pressure in the normally low pressure existing in the motor chamber 41. On its face, it would appear that this would tend to retard movement of the plunger 39. However, an increase in pressure in the motor chamber 41 would reduce the differential in the pressure between the valve chambers 93 and 94, thus tending to assist the operator in moving the valve member 101 toward its seat, or in moving the valve seat member 95 toward its seat 92, depending upon the stage of brake operation in which the steering motor is operated.

Since the system is entirely filled with liquid, any tendency for the pressure to increase in the chamber 94 will result in an immediate increase in pressure in the chamber 93 due to the tendency of one of the valve elements to move toward its seat, and instantly an increase in pressure in the chamber 40 will occur. Thus proportionate pressures in the chambers 40 and 41 will occur and an increase in pressure in the chamber 41 due to operation of the steering valve thus will have no effect on the mechanism. In this connection, attention is again invited to the fact that pressure differentials between the chambers 40 and 41 and the chambers 93 and 94 are not affected in any way by differences in the areas of the elements exposed to pressures in such chambers. In other words, the rods 44 and 48 being equal in diameter, pressures acting on the piston 39 will be subject strictly to differences in cylinder pressures without regard to differences in areas exposed to such pressures. It is this fact that results in maintaining pressures in the motor chambers in a predetermined ratio during any given stage of brake operation. The same theory applies to the valve device, as explained above. In this respect, therefore, the present mechanism is advantageous over the copending application identified above.

Moreover, the rod 60 substantially reduces the area of the plunger 67 exposed to pressure in the chamber 69, whereas no stem projects from the opposite side of the plunger 67. Hence the amount of fluid required to be supplied to the chamber 69 upon a given movement of the plunger 67 toward the right is less than the quantity of fluid which will be displaced from the chamber 68. The present apparatus also is advantageous over the copending application referred to in this respect, since reverse conditions are present in such application. In other words, the chamber of the high pressure cylinder in the copending application, to which fluid is displaced by the master cylinder, extends over the entire area of the high pressure plunger and requires a greater displacement of fluid therethrough than is displaced from the high pressure chamber due to the presence of the rod therein connected to the plunger and reducing the effective area thereof. The present apparatus therefore requires a smaller quantity of fluid in the manually operated parts of the system than is true in the pending application.

It is desirable, of course, to limit the maximum pressure which can be applied to the motor chamber 40 since adequate pressure at all times must be made available to the steering motor. The spring 136 determines the maximum pressure which can be made effective in the chamber 40. When such maximum pressure is reached, the ball valve member 130 will be cracked from its seat to bypass fluid from the chamber 40 through passages 125 and 126 into the low pressure motor chamber 41. Accordingly, ample hydraulic pressure is always available for operating the steering mechanism.

Assuming that in a panic stop, for example, it is necessary to apply braking forces in excess of those which normally would be applied up to the point of maximum energization of the booster motor, the operator can continue to apply forces to the brake pedal. Under such conditions, the pressure built up in the chamber 69 will exceed that required for maximum energization of the motor, and such increased pressures act against the plunger 67 to provide for increased brake application.

The releasing of the brakes will take place in a manner which will be generally apparent from the drawings. When the brake pedal is released, there will be an immediate restoration of normal pressures in the chambers 69 and 108, and the valves will return to normal position to balance pressures in the motor chambers 40 and 41. The return spring 56 will then promptly return the piston 39 to its normal position. The return spring 82 for the high pressure cylinder will return the plunger 67 to its normal position, and immediately upon engagement of the pin 72 with the washer 80, the ball valve member 75 will be opened to establish normal communication between the chambers 68 and 69 for the replenishment of any fluid losses from the high pressure end of the system.

As is well known, the fluids used in hydraulic braking systems and in hydraulic motors used for the same purpose as the present one are entirely different in nature, and the commingling of such liquids should be prevented. Referring to Figures 2 and 3, it will be noted that while the rods 44 and 60 are efficiently sealed in their bearings, some slight seepage of liquid is bound to occur into the space between the bearing 53 and nut 61. In time, this seepage would accumulate in the space referred to and might result in some slight amount of the mixed fluids finding their way into either the motor or the brake system. Hence the space between the bearing 53 and nut 61 is open to the atmosphere at the bottom thereof, as at 63. Any accumulation of liquid in the space referred to thus is prevented.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In combination with an open hydraulic circulating system comprising a pump, a supply line connected at one end to said pump, a mechanism to be operated by fluid supplied through said line and including a valve mechanism connected to the other end of said line and the operation of which causes back pressure in said line, and a return line connected between said valve mechanism and said pump, a motor mechanism comprising a motor cylinder having heads and a piston therein dividing said cylinder to form a pair of chambers connected in said supply line and one of which chambers is open to said pump while the other of said chambers is open to said valve mechanism, stems of equal diameter projecting in opposite directions from said piston and slidable in said heads whereby said piston has equal areas open to said chambers, a housing having a first chamber therein communicating with said one motor chamber and a second chamber therein communicating with said other motor chamber, a valve seat between said first and second chambers opening toward said second chamber, a normally open valve member in said second chamber whereby said motor chambers normally communicate with each other, a stem carrying said valve member and having end portions of equal diameter projecting respectively through said first and second chambers and slidable in said housing whereby said valve member normally has equal areas exposed to fluid in said first and second chambers, and means connected to said valve member to transmit a force thereto to move it toward said seat and throttle the flow of fluid through said supply line whereby pressure will be built up in said one motor chamber to operate said piston.

2. The combination defined in claim 1 wherein said means connected to said valve member to transmit a force thereto comprises a pressure responsive element engaging at one end against said stem to transmit a force to said valve member, and manually operable means for supplying hydraulic pressure to the other side of said pressure responsive element to effect movement thereof.

3. The combination defined in claim 1 provided with a combined valve and valve seat element, a second valve seat between said first and second chambers opening toward said second chamber, and spring means biasing said combined element against said second seat, said combined element having an axial opening therethrough cooperating with said valve member to restrict communication between said first and second chambers when said valve is moved toward said combined element.

4. A motor mechanism comprising a cylinder having spaced heads and a piston therein dividing said cylinder to form a pair of motor chambers, a housing, a first chamber in said housing communicating with one of said motor chambers and a second chamber in said housing communicating with the other motor chamber, means for continuously supplying hydraulic fluid to said first chamber, means for discharging hydraulic fluid from said other motor chamber, a first valve seat between said first and second chambers opening into said second chamber, a throttling valve member arranged in said second chamber and opening away from said seat, biasing means normally maintaining said valve member in open position, a second valve seat in said second chamber opening into said second chamber, said first valve seat forming a valve element engageable with said second seat, spring means biasing said first valve seat toward said second valve seat, said housing having axially alined bearings, a stem connected to said valve member and having opposite end portions of equal diameter slidable in said bearings, and means connected to said valve member to transmit force thereto to move it toward said first valve seat to throttle the flow of fluid therethrough and thus build up pressure in said one motor chamber, said piston having stems of equal diameter slidable in said heads whereby said piston has equal areas exposed to fluid in said motor chambers.

5. A motor mechanism according to claim 4 wherein said means for transmitting force to said valve member comprises a pressure responsive member having mechanical engagement with one end of said stem, and manually operable means for subjecting the other end of said pressure responsive member to hydraulic pressure to effect movement thereof.

6. In combination with an open hydraulic circulating system comprising a pump, a supply line connected at one end to said pump, a mechanism to be operated by fluid supplied through said line and including a valve mechanism connected to the other end of said line and the operation of which causes back pressure in said line, and a return line connected between said valve mechanism and said pump, a motor mechanism comprising a motor cylinder having heads and a piston therein dividing said cylinder to form a pair of chambers connected in said supply line and one of which chambers is open to said pump while the other of said chambers is open to said valve mechanism, stems of equal diameter projecting in opposite directions from said piston and slidable in said heads whereby said piston has equal areas open to said chambers, a bypass connected between said chambers, a normally open valve member in said bypass opening toward said other chamber for the flow of fluid from said pump into said other chamber, a pressure cylinder, a pressure generating plunger movable therein to generate pressure in one end thereof, a low pressure chamber in the other end of said pressure cylinder, pedal operable means for displacing fluid into said low pressure chamber, and pressure responsive means open to pressure in said low pressure chamber and engageable with one end of said stem to move said valve member toward closed position to throttle the flow of fluid through said bypass whereby pressure will be built up in said one motor chamber to operate said piston.

7. The combination defined in claim 6 wherein said pressure generating plunger is provided with a stem projecting through said low pressure chamber and having mechanical connection with said piston, said stem reducing the effective area of said pressure generating plunger open to said low pressure chamber whereby the amount of fluid flow into said low pressure chamber for a given movement of said pressure generating plunger is less than the amount of fluid displaced by said pressure generating plunger.

8. The combination defined in claim 6 provided with a first and a second chamber forming parts of said bypass, said first chamber communicating with said one motor chamber and said second chamber communicating with said other motor chamber, said valve member being arranged in said second chamber.

9. The combination defined in claim 6 provided with a housing having a first chamber and a second chamber therein forming parts of said bypass, said first chamber communicating with said one motor chamber and said second chamber communicating with said other motor chamber, a valve seat in said housing opening toward said second chamber, a combined valve and seat element normally engaging said seat, a spring biasing said combined element toward said seat, said combined element having a passage axially therethrough and being engageable by said valve member, and a stem carrying said valve member and having opposite end portions of equal diameter slidable in said housing whereby, when said valve member is in normal position, it has equal effective opposite areas exposed to fluid in said bypass.

References Cited in the file of this patent

UNITED STATES PATENTS

| | | |
|---|---|---|
| 859,407 | McMullen | July 9, 1907 |
| 1,890,010 | Vickers | Dec. 6, 1932 |
| 1,962,857 | Cash | June 12, 1934 |
| 2,320,445 | Martin | June 1, 1943 |
| 2,662,376 | Price et al. | Dec. 15, 1953 |
| 2,680,350 | Sprague et al. | June 8, 1954 |